(12) United States Patent
Bajema

(10) Patent No.: US 6,540,911 B1
(45) Date of Patent: Apr. 1, 2003

(54) DEWATERING SYSTEM

(75) Inventor: Rick W. Bajema, Plano, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/653,547

(22) Filed: Aug. 31, 2000

Related U.S. Application Data

(60) Provisional application No. 60/153,035, filed on Sep. 10, 1999.

(51) Int. Cl.[7] .................. B01D 35/027; B01D 35/22; B01D 35/34
(52) U.S. Cl. .................. 210/154; 210/155; 210/156; 210/162; 210/409; 209/156
(58) Field of Search .................. 210/409, 154, 210/155, 156, 163, 162; 209/155, 156, 157

(56) References Cited

U.S. PATENT DOCUMENTS

| | | | |
|---|---|---|---|
| 262,702 A | * | 8/1882 | Sears et al. |
| 520,993 A | * | 6/1894 | Keller |
| 968,242 A | * | 8/1910 | Inman |
| 1,186,677 A | | 6/1916 | Parker |
| 1,195,264 A | | 8/1916 | Pennington |
| 1,209,900 A | | 12/1916 | Stebler et al. |
| 1,252,833 A | | 1/1918 | Parker |
| 2,196,451 A | | 4/1940 | Holzer |
| 2,234,502 A | | 3/1941 | Pixton |
| 2,283,512 A | | 5/1942 | Sias |
| 2,426,398 A | | 8/1947 | Lathrop |
| 2,578,808 A | | 12/1951 | Johnson et al. |
| 2,698,087 A | | 12/1954 | Call et al. |
| 3,252,769 A | | 5/1966 | Nagelvoort |
| 3,420,371 A | | 1/1969 | Roller |
| 3,568,839 A | | 3/1971 | Dunlea |
| 3,572,505 A | * | 3/1971 | Jongbloed ................. 209/268 |
| 3,702,656 A | | 11/1972 | Gutterman et al. |
| 3,822,015 A | | 7/1974 | Hsieh et al. |
| 4,111,798 A | | 9/1978 | Peterson et al. |
| 4,113,608 A | | 9/1978 | Kazama et al. |
| 4,157,295 A | | 6/1979 | Liller |
| 4,169,787 A | | 10/1979 | Gunnerson |
| 4,190,678 A | | 2/1980 | Pleus |
| 4,225,424 A | | 9/1980 | Patzlaff |
| 4,247,397 A | * | 1/1981 | Dobosi ..................... 210/162 |
| 4,375,264 A | | 3/1983 | Porter |
| 4,472,274 A | * | 9/1984 | Williams .................. 210/163 |
| 4,759,841 A | | 7/1988 | Flodin |
| 4,801,377 A | * | 1/1989 | Bolt ......................... 210/162 |
| 4,997,566 A | * | 3/1991 | Davis ....................... 209/273 |
| 5,305,888 A | | 4/1994 | Meylor et al. |
| 5,330,643 A | * | 7/1994 | Webb et al. .............. 210/255 |
| 5,526,612 A | * | 6/1996 | Wade ....................... 210/474 |
| 5,779,888 A | * | 7/1998 | Bennett ................... 210/162 |
| 6,063,296 A | | 5/2000 | Ackerman et al. |

FOREIGN PATENT DOCUMENTS

| | | |
|---|---|---|
| DE | 299 07 432 U1 | 9/1999 |
| WO | WO 92/21837 | 12/1992 |

* cited by examiner

*Primary Examiner*—Robert J. Popovics
(74) *Attorney, Agent, or Firm*—Rothwell, Figg, Ernst & Manbeck

(57) ABSTRACT

A dewatering system for separating a stream of liquid from the items traveling therein. The dewatering system includes a primary grid which catches the stream of liquid from a flume or other device. The liquid stream, but not the solid items, passes through the primary grid and is caught by a baffle which smoothly redirects the liquid. The baffle is arranged with respect to the primary grid so that the surface of the stream flow through the grid is substantially tangential to a leading portion of the baffle.

19 Claims, 5 Drawing Sheets

DEWATERING SYSTEM

This application claims the benefit of U.S. Provisional Application No. 60/153,035, filed Sep. 10, 1999.

BACKGROUND OF THE INVENTION

1. Field of the Invention

The present invention relates to a system for removing items from a flowing liquid stream. In particular, the invention is directed to an improved dewatering system for use in separating liquid, such as water, from potatoes, other root crops, vegetation, or other solid items entrained in a flowing stream of the liquid.

2. Description of the Related Art

It is known in the art to convey, through a processing facility, solid items in a stream of liquid and then to separate the items from the liquid prior to a downstream processing procedure. For example, potatoes or other root crops may be conveyed through a processing facility entrained in a stream of liquid (e.g., water or brine). At some point, however, e.g., prior to slicing or peeling the potatoes or other root crops, the crops must be separated from the liquid (i.e., dewatered). Traditionally in the potato processing industry, potatoes have been dewatered by passing the stream of water (or other conveying liquid) and the entrained potatoes from a flume carrying the stream over a grid through which the water, but not the potatoes, may pass. Such grids would typically be oriented at a relatively steep decline (e.g. 35–45 degrees) and would traverse a significant drop (e.g., on the order of 36 inches) to ensure that the potatoes would continue forward movement after being dewatered. Moreover, the volume of liquid flow (typically on the order of 500 to 1500 gallons/minute) required that the grid be rather wide (e.g., on the order of 3 feet or more) to accommodate the volume. Also, the significant drop of the grid would create a large amount of hydrodynamic energy, and the falling water would merely impinge on a surface beneath the grid, thus resulting in significant splashing of the water and bruised or otherwise damaged potatoes. Furthermore, to ensure adequate dewatering, in view of the amount of splashing created during the dewatering process, it is necessary for the conventional grids to be quite long (e.g. 36–48 inches). Such large dewatering systems are space-consuming, and the large width of the system often requires a downstream concentrating conveyor to bring the potatoes into a narrower stream for feeding the potatoes to a subsequent processing device, e.g., a slicer or peeler.

Accordingly, there is a need for a dewatering system that effectively removes the solid items from a stream of liquid in a relatively small envelope and in such a manner so as not to subject the items to hard collisions and other abuse.

SUMMARY OF THE INVENTION

The present invention overcomes the shortcomings of existing devices and methods of item dewatering.

In accordance with aspects of the present invention the shortcomings of prior art dewatering systems are overcome by a dewatering apparatus for substantially separating liquid from a flowing stream of liquid and solid items entrained therein. The dewatering apparatus comprises a primary grid having openings through which a substantial portion of the flowing liquid stream may pass but through which at least a substantial portion of the solid items entrained in the liquid will not pass. The primary grid separates a substantial portion of the liquid from a substantial portion of the solid items and conveys the separated solid items toward a discharge of the primary grid. The apparatus further comprises a baffle positioned beneath the primary grid to capture and redirect a substantial portion of the liquid stream passing through the openings of the primary grid. The baffle has a leading portion proximate the primary grid. The primary grid and the leading portion are oriented so that a top surface of the stream passes through the primary grid at an orientation that is substantially tangential to the leading portion of the baffle.

An apparatus constructed in accordance with the principles of the present invention can be made much smaller, and therefor less costly, than conventional dewatering apparatuses. Moreover, the apparatus is less damaging to the solid items separated from the liquid stream and, in applications involving potato processing, can be used to feed dewatered potatoes directly into downstream processing devices, such as peelers and slicers.

Other objects, features, and characteristics of the present invention, including the methods of operation and the function and interrelation of the elements of structure, will become more apparent upon consideration of the following description and the appended claims, with reference to the accompanying drawings, all of which form a part of this disclosure, wherein like reference numerals designate corresponding parts in the various figures.

DETAILED DESCRIPTION OF THE PREFERRED EMBODIMENTS

Figure 1:
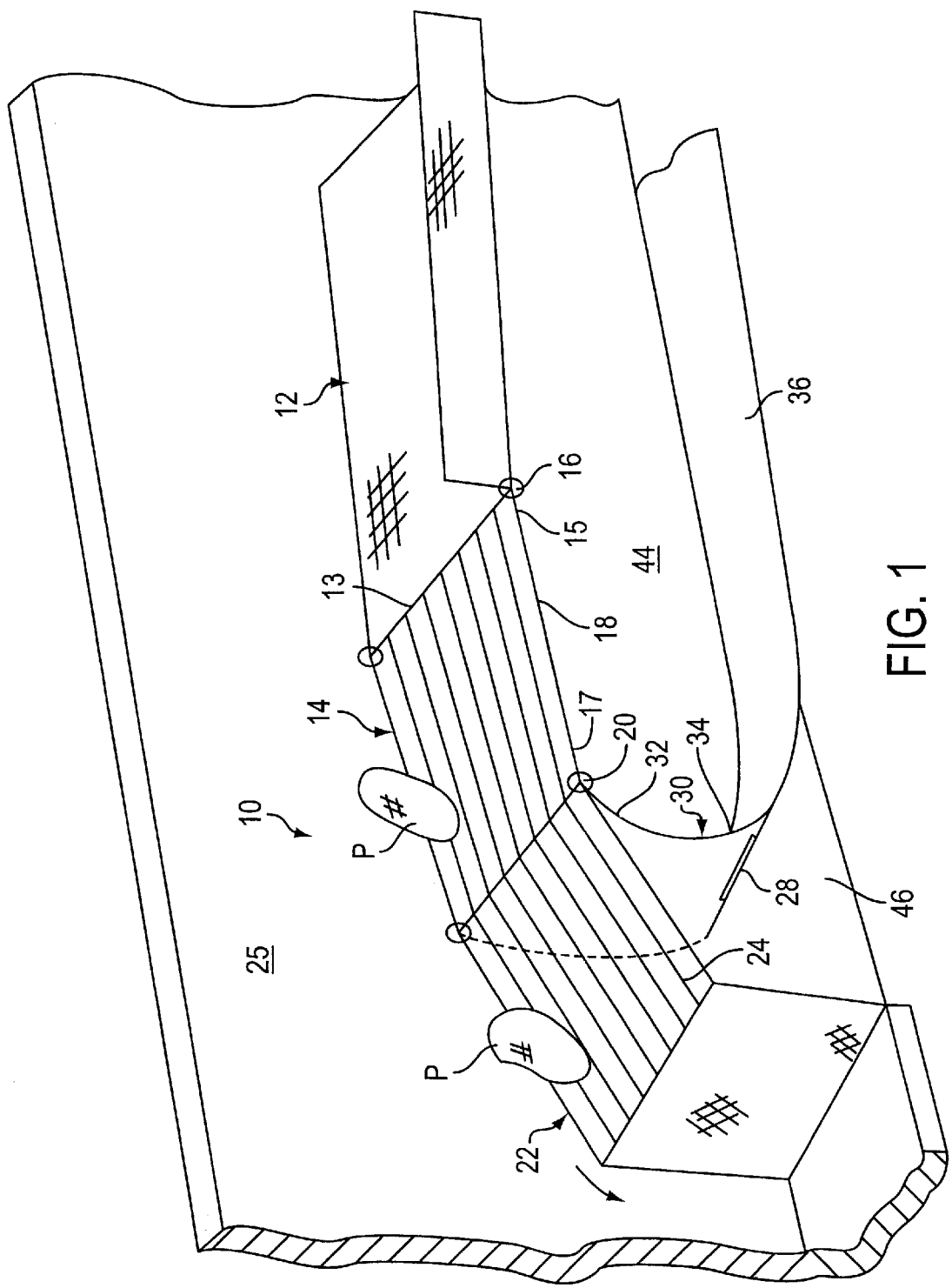
FIG. 1 is a perspective view of a dewatering system according to the present invention.
Figure 2:
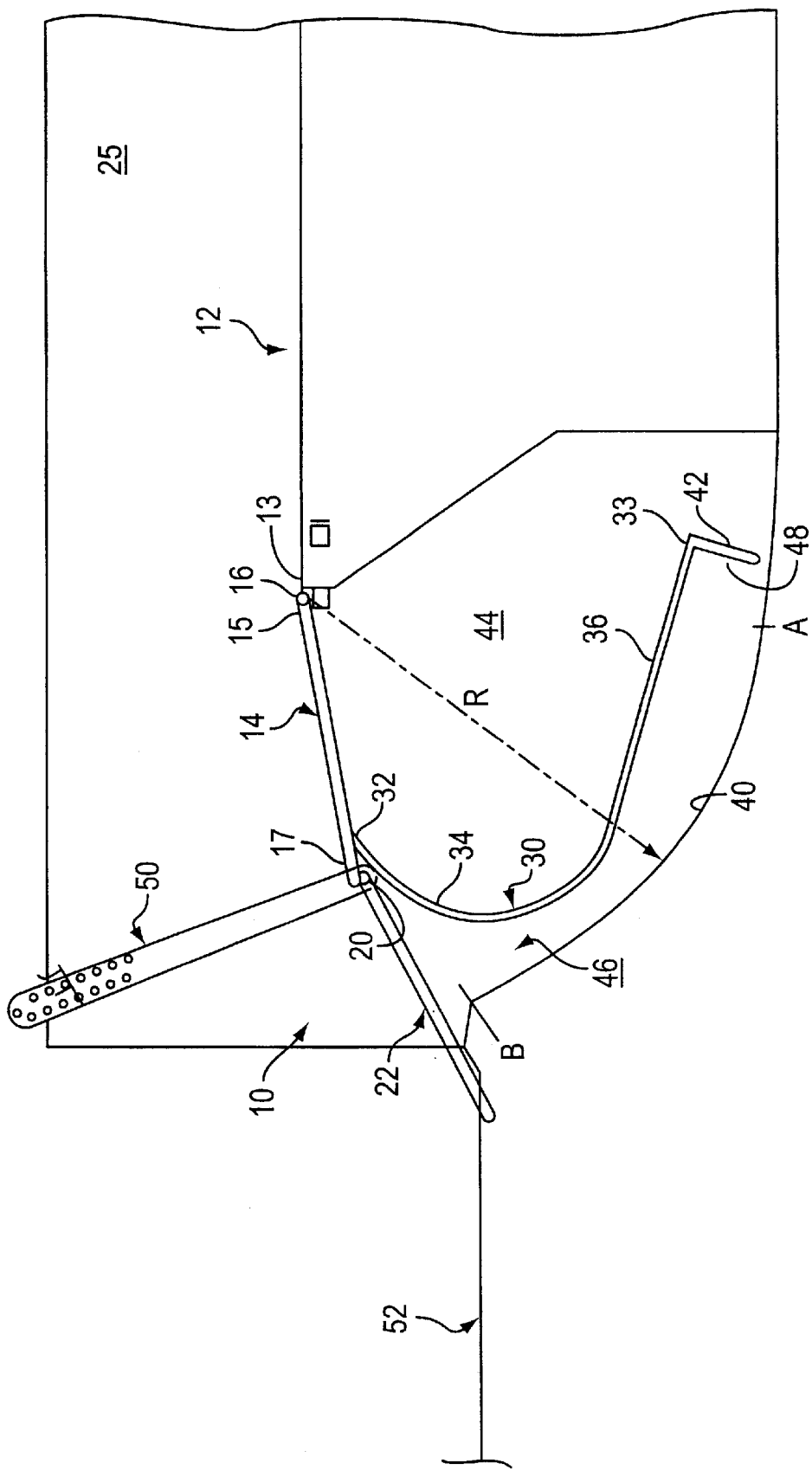
FIG. 2 is a side view of a preferred embodiment of the dewatering system according to the invention.
Figure 3:
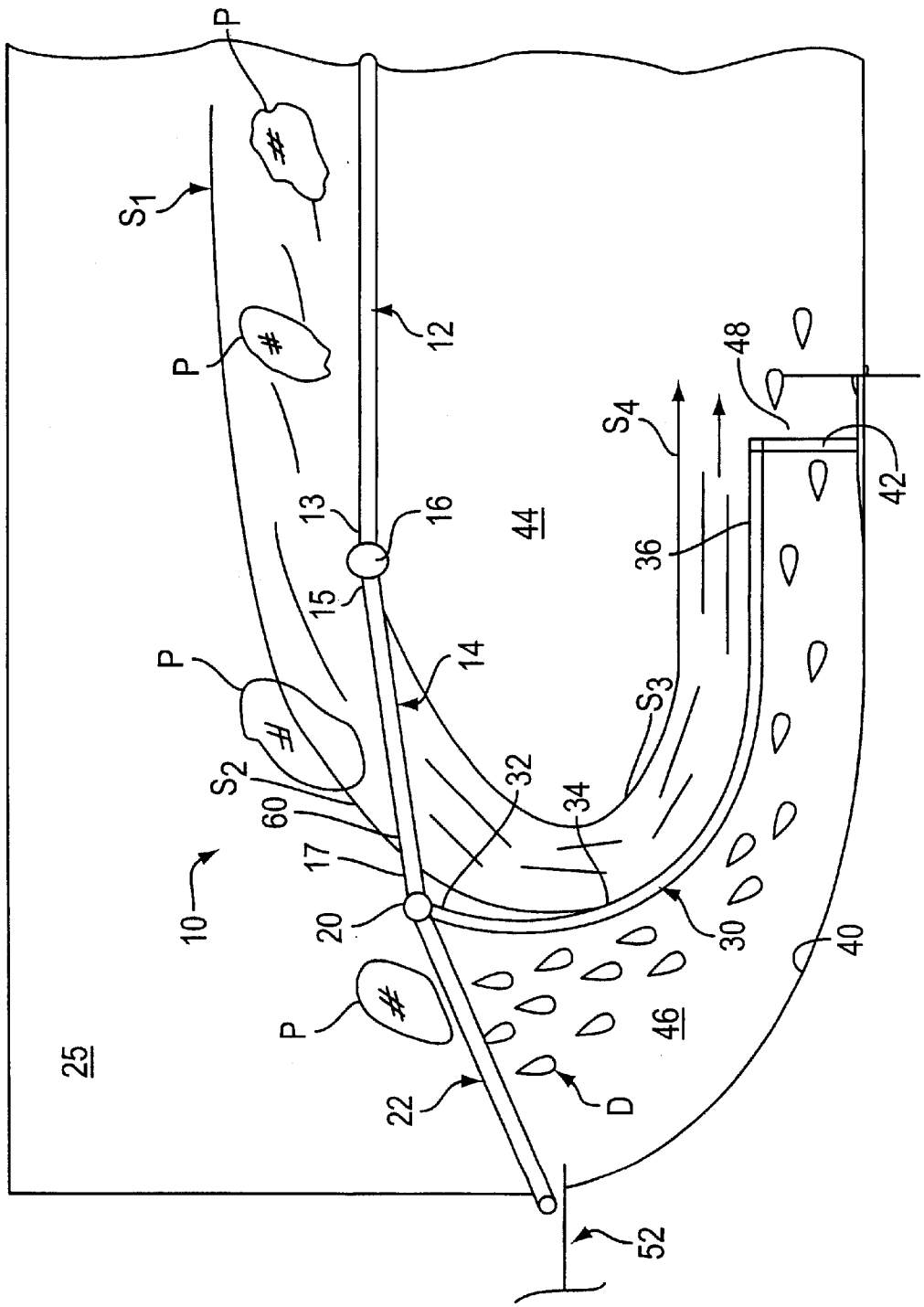
FIG. 3 is a side view of the dewatering system showing items (e.g., potatoes) being removed from a stream of liquid flowing from a flume.

A dewatering system according to the present invention is designated generally by reference number 10 in FIGS. 1–3. As shown in FIG. 1, in the illustrated embodiment, the dewatering system 10 is positioned in front of a flume 12 (or pipe) through which a stream of liquid and solid items entrained therein may flow. The flume 12 is depicted in FIG. 1 as being oriented generally horizontally and as having a rectangular cross-section. However, the flume may be oriented at any angle relative to horizontal as long as the liquid flow is strong enough to be transported, along with the solid items entrained therein, over the flume and to its discharge end 13. Furthermore, the cross-sectional shape of flume 12 may be of any shape which allows the items to flow within the flume. For example, the dewatering system 10 may be positioned in front of a device that hydrodynamically removes debris from harvested potatoes (or other ground crops) and sorts the potatoes according to size and/or weight, such as the device disclosed in U.S. patent application Ser. No. 08/904,834, the disclosure of which is hereby incorporated by reference.

In its most basic form, the dewatering system 10 comprises a primary grid 14 having a receiving end 15 and a discharge end 17. The primary grid 14 is located with the receiving end 15 thereof positioned with respect to the discharge end 13 of the flume 12 so as to receive a stream of liquid and entrained solid items flowing from the flume 12 and over the primary grid 14.

In a preferred embodiment, the primary grid 14 is comprised of a plurality of longitudinally-extending rods 18 oriented in a streamwise direction. As an exemplary, non-limiting example, the primary grid 14 may be formed of a plurality of ½ inch diameter rods positioned at 1 inch centers and having a length of 16–18 inches. The transverse width of the grid may be about 12 inches. It has been experimentally determined that a primary grid having the foregoing dimensions can accommodate the flow rates typically encountered in commercial potato processing operations. Sidewalls 25 are provided on opposites sides of the primary grid 14 (and typically on opposite sides of the flume 12 as well). For clarity in the illustration, only one sidewall 25 is shown in FIGS. 1–3, and the sidewalls 25 are omitted altogether in FIGS. 4 and 5.

Longitudinal rods 18 are preferably cylindrical (i.e., have a circular cross-sectional shape) but may have other cross-sectional shapes, as desired. For example, wedge wire, comprising a plurality of longitudinal rods having a triangular cross-sectional shape, may be employed as well. Rods having rectangular or other polygonal cross-sectional shapes may be used as well. While, in the preferred embodiment, the primary grid 14 is comprised of a plurality of longitudinally-extending rods, any construction having openings sized so as to permit the liquid to pass therethrough but to prevent the solid items to be separated from the liquid from passing therethrough may be employed. For example, in certain applications, a mesh material may be employed. A mesh, or any construction having transverse structural elements, is not, however, preferred for potato processing, as such transverse elements can impede the longitudinal flow of liquid and potatoes thereby creating a risk that the system will become clogged.

In the preferred embodiment, the primary grid 14 is supported at its receiving end 15 by means of a leading pivot hinge 16 that permits a variable orientation of the primary grid 14. The purpose and function served by the variable orientation capability will be described in more detail below. It can be appreciated that when a stream of liquid with entrained solid items, such as potatoes P, flows from the flume 12 onto the primary grid 14, a substantial portion (preferably 90% or more) of the liquid will fall through the grid 14. But, the solid items P, not able to pass through the grid 14, will be conveyed by the momentum of the liquid stream toward the discharge end 17 of the primary grid 14. Accordingly, the solid items P moving across the discharge end 17 of the primary grid 14 will be substantially dewatered.

A redirecting baffle 30 is positioned primarily below the primary grid 14. The redirecting baffle 30 comprises a panel extending between the sidewalls 25 that is substantially flat in the transverse direction. The baffle 30 includes a leading portion 32 attached to a bottom portion of the primary grid 14 proximate the discharge end 17 thereof. The leading portion 32 may be rigidly attached to the primary grid 14, or it may be connected to the primary grid 14 by means of a hinge permitting a variable angle between the leading portion 32 and the primary grid 14. The baffle 30 also preferably includes a curved portion 34 and a straight portion 36 extending continuously from an end of the curved portion 34.

As shown in FIG. 2, in a preferred embodiment, a trailing end 33 of the baffle 30 is supported slightly above a guide surface 40 by means of spacer elements 42. Spacer elements 42 are rigidly attached to the baffle 30 but are able to translate (e.g., slide) with respect to the guide surface 40. In the preferred embodiment, as shown in FIG. 2, guide surface 40, which also extends between sidewalls 25 and is substantially flat in the transverse direction, includes a curved portion extending between points A and B. The curved portion between points A and B is preferably disposed at a constant radius R with respect to the leading pivot hinge 16 of the primary grid 14.

As the orientation of the primary grid 14 is adjusted by pivoting it about the leading pivot hinge 16, the position and orientation of the baffle 30 is permitted to change in conformance to the new orientation of the primary grid 14. The guide surface 40, along which the spacer elements 42 may translate during reorientation of the primary grid 14, maintains the proper orientation of the baffle 30.

As shown in FIG. 2, an adjustment bar 50 may be connected to the discharge end 17 to facilitate orientation adjustment of the primary grid 14.

In a preferred arrangement, a secondary grid 22 extends from the discharge end 17 of the primary grid 14. Secondary grid 22 is preferably also formed from a plurality of parallel, longitudinally-extending rods 24. In a preferred arrangement, the primary grid 14 and the secondary grid 22 are connected to one another by a trailing pivot hinge 20 to permit variable relative orientations of the primary grid 14 and the secondary grid 22.

The area beneath the primary grid 14 and bounded by the baffle 30 defines a primary chamber 44, and the area beneath the secondary grid 22 and bounded by the guide surface 40 and the baffle 30 defines a secondary chamber 46. An opening 28 may be formed in the baffle 30, which opening extends between the primary chamber 44 and the secondary chamber 46. Alternatively, as shown in FIG. 2, an opening communicating between the primary chamber 44 and the secondary chamber 46 may be provided at 48 between adjacent spacer elements 42.

Operation of a preferred embodiment of the dewatering system 10 is illustrated in FIG. 3. An incoming stream $S_1$ of liquid with entrained solid items P flows over the flume 12 toward the discharge end 13 thereof. Passing over the discharge end 13 of the flume 12 and onto the receiving end 15 of the primary grid 14, the stream transitions to a falling stream $S_2$ in which a substantial portion (preferably 90% or more) of the liquid within the stream falls through the primary grid 14, thereby separating the solid items P from a substantial portion of the liquid. Preferably, the orientation of the primary grid 14 and the orientation of the baffle 30 are set so that a leading surface of the liquid stream 60 passes through the primary grid 14 upstream of, but close to, the leading portion 32 of the baffle 30. The falling stream $S_2$ will have a leading edge 60 defined herein as the transverse line at which the surface of the falling stream $S_2$ passes through the primary grid 14. It is desirable that the leading edge 60 occur upstream of the discharge end 17 of the primary grid, so that a substantial portion of the liquid within the stream passes through the primary grid 14 and the solid items passing over the discharge end of the primary grid 17 are substantially dewatered. It is also desirable that the leading edge 60 occur near the leading portion 32 of the baffle 30 so that the surface of the falling stream $S_2$ contacts the leading portion 32 of baffle 30 in a substantially tangential manner to provide for a smooth redirection of the stream. Smooth redirection of the liquid can be achieved if the surface of the falling stream $S_2$ contacts the leading portion 32 at a shallow angle of 0–25°. If the leading edge 60 occurs at a substantially upstream position from the leading portion 32 of the baffle 30, the surface of the falling stream $S_2$ will impinge on the baffle 30 at a more transverse orientation with respect to the baffle 30, thereby causing the flow of the stream to locally stall and creating substantial splashing.

As the falling stream $S_2$ contacts the baffle 30, preferably in a substantially tangential manner, the stream transitions to a redirecting stream $S_3$ as the stream passes over the curved portion 34 of the baffle 40, thereby redirecting the direction of flow of the stream. The redirecting stream $S_3$ thereafter transitions into a return stream $S_4$ as the stream passes over the straight portion 36 of the baffle 30. The return stream $S_4$ may thereafter be directed toward a drain or pump or storage tank for further use and/or processing of the liquid. In the illustrated embodiment, the return stream $S_4$ is substantially parallel to and in an opposite direction of the incoming stream $S_1$. That, however, need not be the case. That is, the return stream $S_4$ may be directed in an inclined or declined orientation and/or it may be directed transversely relative to the incoming stream $S_1$.

After a substantial portion of the liquid stream passes through the primary grid 14, the solid items P separated from the liquid stream are carried by momentum to the discharge end of the primary grid 17. Thereafter, the solid items P move onto the secondary grid 22. The secondary grid 22 is preferably oriented at such an angle that the solid items P will move along the secondary grid 22 under their own momentum with the assistance of the force of gravity. The secondary grid 22 may be at the same angle as or at a greater or lesser angle than primary grid 14. Alternatively, if the secondary grid 22 is omitted from the dewatering system 10, the solid items P separated from the stream may pass over the discharge end 17 of the primary grid 14 onto a subsequent conveying or processing mechanism.

After passing onto the secondary grid 22, any remaining liquid carried on or moving with the solid items P may fall through the secondary grid 22 into the secondary chamber 46, as schematically represented by a plurality of droplets D shown in FIG. 3. In this regard, this secondary dewatering step can be facilitated by providing the suction opening 48 (or 28) between the primary chamber 44 and the secondary chamber 46. As the liquid flows over the baffle 30 and across the suction opening 48 (or 28), the rapid flow of the liquid across the opening creates a venturi suction, thus creating a low pressure region in the secondary chamber 46. The low pressure in the secondary chamber 46 will draw liquid through the secondary grid 22, so that more additional liquid is removed from the solid items P than if the liquid were removed at the secondary grid 22 merely by the force of gravity alone. The suction opening 48 (or 28) must be sized and oriented so that liquid flows over but not through the opening.

After passing over the secondary grid 22, the solid items P may pass onto a subsequent conveyor and/or processing mechanism as schematically represented at reference number 52 in FIGS. 2 and 3.

Figure 4:
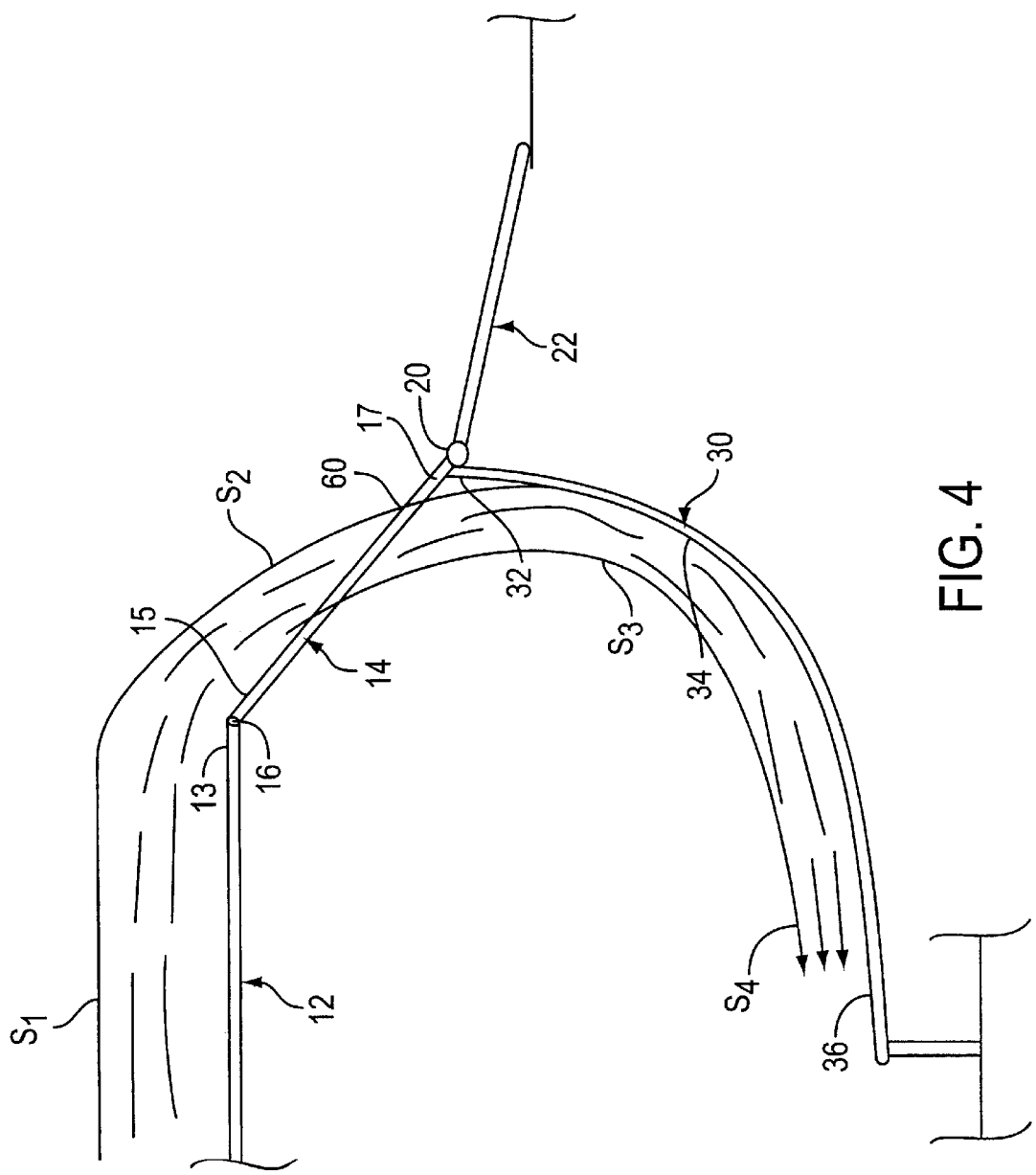
FIG. 4 is a side view of the dewatering system configured for a relatively slow liquid stream.
Figure 5:
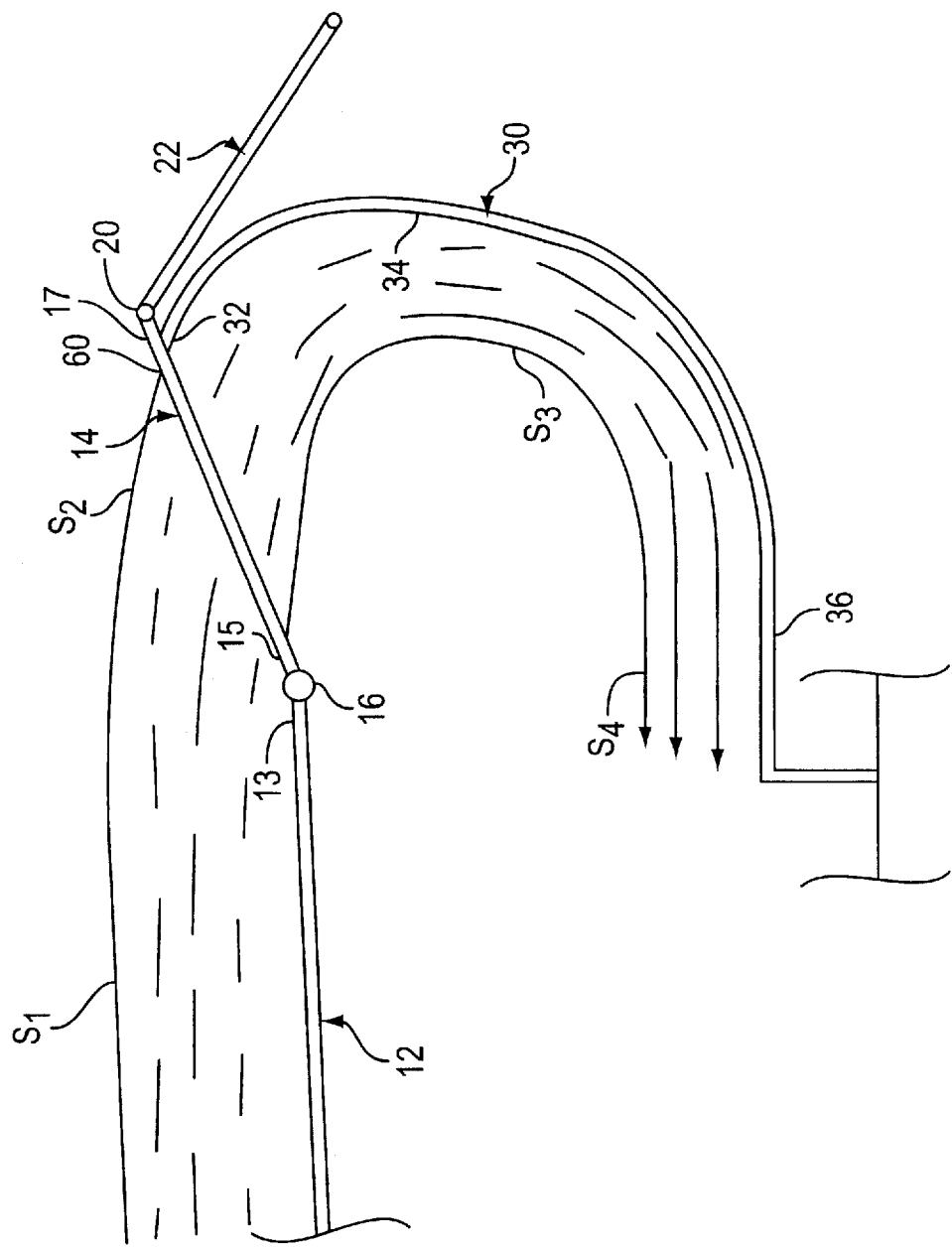
FIG. 5 is a side view of the dewatering system configured for a relatively rapid liquid stream.

FIGS. 4 and 5 illustrate the manner in which the orientation of the primary grid 14 may be adjusted so as to accommodate different relative flow rates of the incoming stream $S_1$. FIG. 4 shows a relatively slow flowing incoming stream $S_1$. Due to the slow flow, and the attendant relatively low momentum of the flow $S_1$, the flow will tend to fall substantially straight down after passing over the discharge end 13 of the flume 12. The primary grid 14 can be oriented at a relatively sharp decline so that the leading edge 60 of the falling stream $S_2$ is located relatively close to the leading portion 32 of the baffle 30. The leading portion 32 of the baffle 30 is also reoriented, so that the surface of the falling stream $S_2$ will contact upon the baffle 30 in a substantially tangential manner to create a smooth redirecting stream $S_3$ and return stream $S_4$.

FIG. 5 shows an arrangement of the dewatering system 10 whereby the primary grid 14 is oriented so as to accommodate a relatively rapid flow rate of the incoming stream $S_1$. As shown in FIG. 5, the primary grid 14 is oriented at a slight positive incline. If the primary grid 14 were not oriented at a positive incline, the momentum of the rapidly flowing incoming stream $S_1$ would cause a substantial portion of the stream to flow completely over the primary grid 14. Thus, the grid 14 is inclined so as to "catch" the incoming stream $S_1$. Furthermore, the orientations of the primary grid 14 and the leading portion 32 of the baffle 30 are preferably such that the leading edge 60 of the falling stream $S_2$ is positioned relatively close to the leading portion 32. The leading portion 32 of the baffle 32 is also oriented so that the surface of the falling stream $S_2$ will contact the baffle 30 in a substantially tangential manner thereby creating a substantially smooth redirecting stream $S_3$ and return stream $S_4$.

If the incoming flow is well-known and generally constant, the primary grid can be arranged in a fixed orientation. In such a circumstance, it is not necessary that the primary grid be supported by a hinge or that the orientation of the primary grid be otherwise adjustable.

While the invention has been described in connection with what are presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. A dewatering apparatus for substantially separating liquid from a flowing stream of liquid and solid items entrained therein, comprising:

a) a primary grid having openings through which a substantial portion of the flowing liquid stream may pass but through which a substantial portion of the solid items entrained in the liquid will not pass for separating at least a substantial portion of the liquid from a substantial portion of the solid items and to convey the separated solid items toward a discharge end of said primary grid, and b) a baffle positioned beneath said primary grid to capture and redirect a substantial portion of the liquid stream passing through the openings of said primary grid, said baffle having a leading portion proximate said discharge end primary grid, wherein said baffle further includes a curved portion extending from said leading portion thereof, said curved portion being curved into a direction generally opposite to the direction of flow over said primary grid such that the portion of the liquid stream impinging on said baffle is redirected in direction generally opposite the direction of the liquid stream flowing onto said primary grid.

2. The apparatus of claim 1, further comprising a hinge supporting said primary grid to allow variable orientation of said primary grid.

3. The apparatus of claim 2, wherein said primary grid is supported proximate a receiving end thereof by a leading pivot hinge.

4. The apparatus of claim 3, wherein said baffle is coupled to said primary grid such that pivoting movement of said primary grid causes a corresponding change in orientation of said leading portion of said baffle.

5. The apparatus of claim 4, wherein said baffle is supported on a guide surface in such a manner that an end of said baffle opposite said leading portion is able to translate along said guide surface as said primary grid is pivoted about said leading pivot hinge.

6. The apparatus of claim 5, wherein said guide surface includes a curved portion disposed at a constant radius with respect to said leading pivot hinge.

7. The apparatus of claim 1, further comprising a secondary grid adjacent to said primary grid.

8. The apparatus of claim 7, wherein said secondary grid is attached to said primary grid with a hinge.

9. The apparatus of claim 7, wherein said baffle has an opening formed therein to create a venturi effect as liquid flows over the opening to draw liquid through said secondary grid.

10. The apparatus of claim 7, wherein there is a gap beneath said baffle to create a venturi effect as liquid flows over the gap to draw liquid through said secondary grid.

11. The apparatus of claim 1, wherein said primary grid comprises a plurality of spaced-apart, generally parallel elongated rods extending in a streamwise direction.

12. The apparatus of claim 11, wherein said elongated rods have a generally circular cross-sectional shape.

13. The apparatus of claim 1, wherein said primary grid is positioned at a either a positive or negative angle in reference to horizontal.

14. The apparatus of claim 1, wherein said primary grid and said leading portion are oriented so that a top surface of the stream passes through said primary grid at an orientation that is substantially tangential to said leading portion of said baffle.

15. A dewatering apparatus for substantially separating liquid from a flowing stream of liquid and solid items entrained therein, comprising:

a) a primary grid having a receiving end and a discharge end and having openings through which a substantial portion of the flowing liquid stream may pass but through which a substantial portion of the solid items entrained in the liquid will not pass for separating at least a substantial portion of the liquid from a substantial portion of the solid items and to convey the separated solid items toward said discharge end of said primary grid, said primary grid being adapted to be pivoted about an axis disposed proximate said receiving end and extending transversely to the direction of flow of the flowing liquid stream; and b) a baffle positioned beneath said primary grid to capture and redirect a substantial portion of the liquid stream passing through the openings of said primary grid, said baffle having a leading portion proximate said discharge end primary grid, wherein said primary grid and said leading portion are oriented so that a top surface of the stream passes through said primary grid at an orientation that is substantially tangential to said leading portion of said baffle, said baffle being coupled to said primary grid such that pivoting movement of said primary grid causes a corresponding change in orientation of said leading portion of said baffle.

16. The apparatus of claim 15, wherein said baffle further includes a curved portion extending from said leading portion, said curved portion being curved into a direction generally opposite to the direction of flow over said primary grid.

17. The apparatus of claim 15, wherein said primary grid is supported proximate a receiving end thereof by a leading pivot hinge.

18. The apparatus of claim 15, wherein said baffle is supported on a guide surface in such a manner that an end of said baffle opposite said leading portion is able to translate along said guide surface as said primary grid is pivoted about said leading pivot hinge.

19. The apparatus of claim 18, wherein said guide surface includes a curved portion disposed at a constant radius with respect to said leading pivot hinge.

* * * * *